Feb. 21, 1928. 1,659,623
J. M. BARR
DYNAMO ELECTRIC MACHINE STATOR
Filed Dec. 12, 1923 2 Sheets-Sheet 1
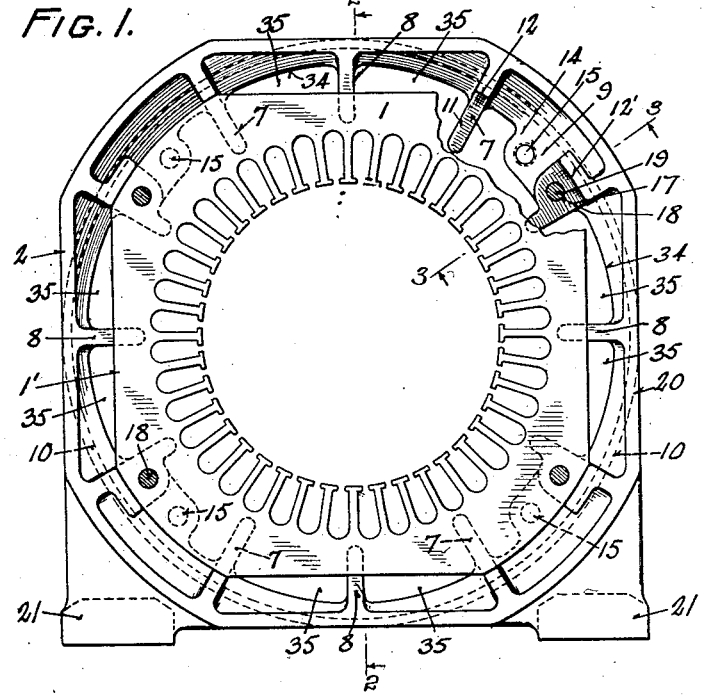
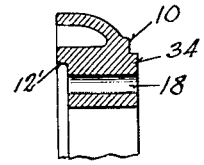
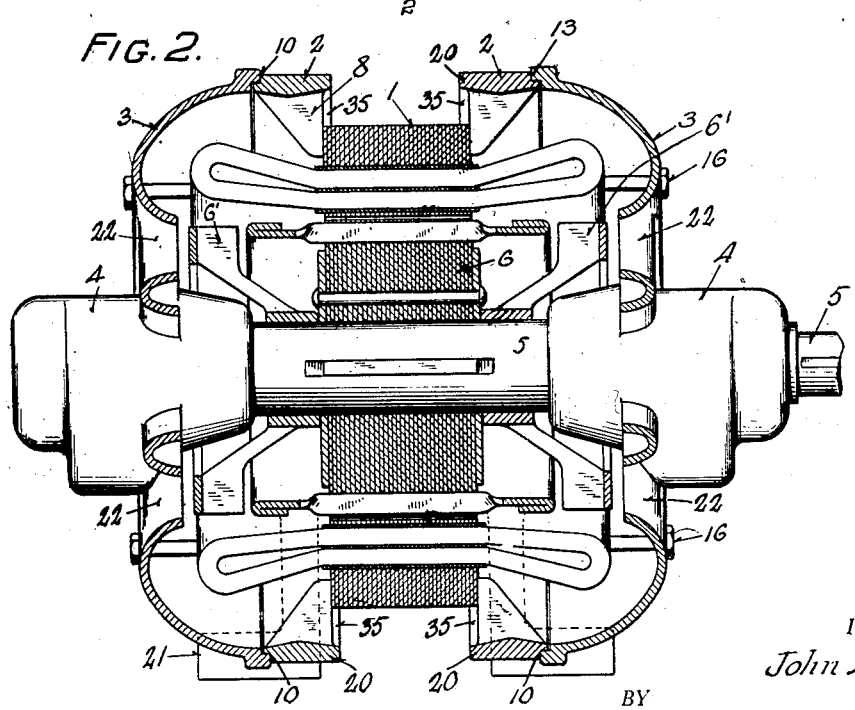
INVENTOR.
John M. Barr
BY
Edwin B. H. Tower, Jr.
ATTORNEY.

Feb. 21, 1928.

J. M. BARR 1,659,623

DYNAMO ELECTRIC MACHINE STATOR

Filed Dec. 12, 1923     2 Sheets-Sheet 2

INVENTOR.
John M. Barr
BY
Edwin B. H. Tower, Jr.
ATTORNEY.

Patented Feb. 21, 1928.

1,659,623

UNITED STATES PATENT OFFICE.

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN.

DYNAMO-ELECTRIC-MACHINE STATOR.

Application filed December 12, 1923. Serial No. 680,162.

This invention relates to a dynamo electric machine stator.

The stator to which the invention is particularly applicable comprises a laminated core, an end frame arranged upon each end thereof and extending away from the same to provide a ventilating space for the passage of air between said core and said frame, and a casing arranged upon each end frame and having an air inlet and an armature bearing.

The structure described herein is an improvement on the structure disclosed in co-pending application, Serial No. 693,615.

An object of the invention is to provide a ventilating space through which air may be passed entirely around the stator core.

Another object of the invention is to provide a stator which is strong, durable, sturdy and efficient.

Another object is to provide a stator which may be readily assembled and disassembled.

Another object is to provide a stator which may be readily and economically manufactured.

These objects are attained by providing a substantially square frame supporting the square stator core.

An embodiment of the invention is shown in the acompanying drawings in which:

Fig. 1 is a vertical transverse cross-section through the center of the machine having the rotor and end casings removed, part of the stator core being broken away.

Fig. 2 is a section through line 2—2 of Fig. 1.

Fig. 3 is a section through line 3—3 of Fig. 1, the stator core being removed.

Figure 4:
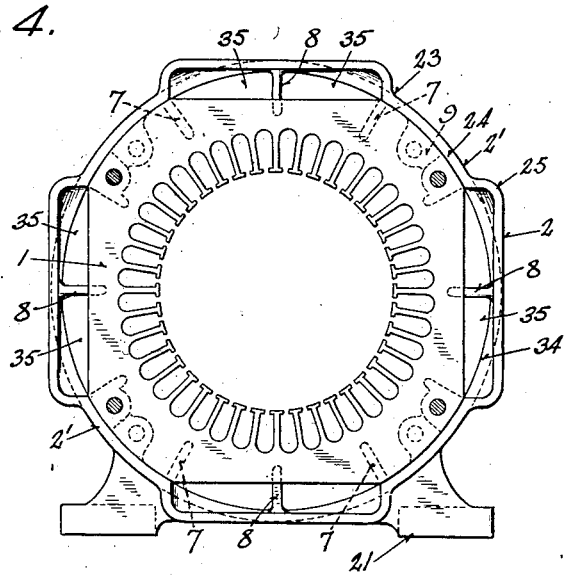
Fig. 4 is a vertical cross-section through a modified form.

The motor is composed of square stator core 1, a support therefor which may consist of end frames 2 and end casings 3.

The end casings 3 may have bearings 4 supporting the shaft 5 which carries rotor 6 and fans 6'.

Frames 2 have lugs 7, 8 and 9 and flange 10.

The lugs 7 extend from one end of the frame to the other end, except for the innermost portion 11, which is cut away to provide the axial or longitudinal flange 12 for the stator core.

Lugs 9 extend from one end of the frame 2 to a short distance from the other end, except that a flange 12' may be provided similar to flange 12 of lug 7.

Lug 8 extends from one end of the frame to within a short distance of the other end.

Thus it will be seen that all of these lugs 7, 8 and 9 provide a recess within frames 2 for receiving the stator core, while portions of the lugs 7 and 9 provide flanges to prevent the stator core from being radially displaced relative to the end frames 2.

The flanges 12 and 12' may be provided with a common axis by subjecting the frame 2 to a rotating tool which will cut the flanges 12 and 12' to a true circle.

The flange 10 may likewise be provided with an axis coincident with that of flanges 12 and 12' by means of a rotating machine.

The end casings 3, if separate from the supporting frames, may be provided with flange 13 to fit over flange 10. Flange 13 may be likewise subjected to a rotating tool to provide it with an axis which may be coincident with that of the flange of frames 2 and with the axis of the bearings 4. The frames 2 and end casings 3 may, however, be made integral.

Lugs 9 may be provided with a bolt receiving portion 14 which does not extend to the face of the stator core. This portion 14 may be provided with a threaded bolt hole 15 adapted to receive bolt 16 passing through the end casings 3 and securing said casings to the frames.

The lugs 9 may be provided with stator core receiving face 17 which may be provided with rivet holes 18.

The stator core may be composed of square laminations 1' punched with rounded corners, the corners forming arcs of a single circle. These laminations may also have holes corresponding to holes 18 of frames 2 and winding slots which may be simultaneously punched.

The faces 17 of lugs 9 and similar faces on lugs 7 and 8 may be machined to leave a rough surface to increase friction between the lugs and the end laminations of the stator core. This rough surface may be supplemented or substituted by water glass, or other abrasive or adhesive substance to increase friction between the faces of the lugs and of the laminations.

In assembling the frames and laminated stator core, one frame may be placed face upward with rivets 19 passing through holes 18. The laminations may then be assembled on rivets 19 and the other frame 2 placed over them. This assembly may be placed around a circular expansible mandrel and after applying a slight pressure to the assembly, the mandrel may be expanded to aline the frames 2 and the laminations 1'. Great pressure may then be applied to this assembly and the rivet metal turned to secure the parts together.

Because the laminations have been punched by true dies, and because the flanges 12 and 12' have been cut by a rotating tool, the parts will fit about a common axis.

The frame 2 is provided with a substantially square periphery or flat sides 20 adjacent the stator core, but which is radially beyond the stator core. The periphery 20 may extend radially beyond the rounded corners of the stator core.

The frames 2 are flared inwardly at the corners toward the center to provide a circular flange 10 for the end casings 3.

As the periphery 20 of the frames 2 extends beyond the stator core, large ventilating orifices 35 are provided to allow the air to leave the interior of the machine and pass through the orifices 35 to the atmosphere.

The end frames 2 are provided with feet 21 integrally or otherwise secured thereto for supporting the machine.

The flange 10, which is circular, supports circular end casings 3 which are provided with air openings 22.

The flanges 10 of the end frames 2 may be subjected to a rotating tool after the end frames and stator core have been assembled and riveted. A mandrel may be placed inside the assembly and the flanges 10 turned by the rotating tool. Sufficient material is provided on the end frames 2 so that the flanges 10 may be machined to planes at right angles to the axis of the assembly. Slight irregularities in the thickness of the laminations or ends frames, which might cause the ends of the assembly not to be parallel, or at right angles to the axis of the assembly, may be compensated by cutting the flanges 10 at right angles to the axis of the assembly.

The lugs 8 prevent the laminations from sagging at the sides. The internal pressure of the stator core causes the outside laminations to bulge outwardly, unless prevented by such means as lugs 8.

In the modification shown in Fig. 4, the end frames 2 may be square as in Fig. 1. The corners of the end frames 2, however, may turn inwardly to receive the rounded corners of the stator core 1. Lugs 7, 8 and 9 may be provided similar to the corresponding lugs in Fig. 1.

The end casings 3 to be used in this modification may be circular, the end frames 2 tapering from the stator core to the end casings 3 to form a circular flange to receive the end casings.

The corner 2' in this modification may form the flange to receive the rounded corners of the stator core. The faces of the lugs 7, 8 and 9 may be roughened to increase friction between the faces of the lugs and of the stator core laminations.

Figure 5:
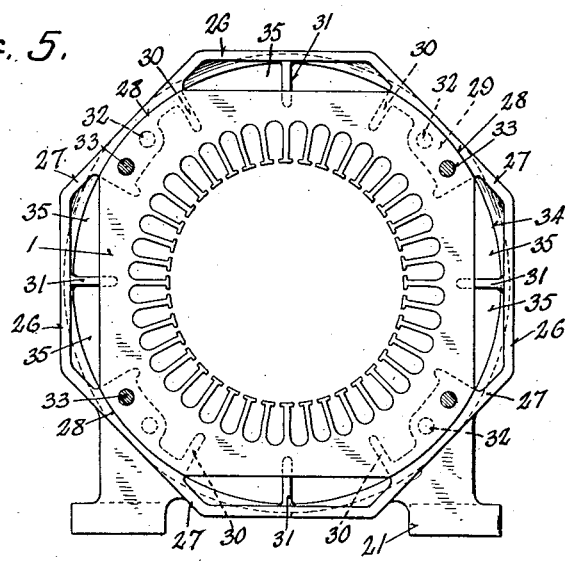
Fig. 5 is a vertical cross-section through another modified form of my invention.

In the modification shown in Fig. 5, the corners of the square frames have been cut off at an angle to receive the corners of the stator core. In this modification the end frames 2 may have a square form adjacent the stator core, having flat sides 26 and corners 27.

The corners 27 may be brought centrally inward so that they may be cut by a rotating tool to provide arc shaped flanges 28 to receive the rounded corners of the stator core.

Lugs 29 and 30 may be provided for holding the corners of the stator core and lugs 31 for holding the sides thereof.

The lugs 29 may be provided with bolt holes 32 and rivet holes 33 having functions similar to those shown in Fig. 1.

In all the modifications, flanges have been provided for receiving the end laminations of the stator core. The laminations within the body of the stator core present large frictional areas of contact to each other. The pressure applied to the laminations by the rivets is sufficient to prevent radial displacement of the laminations within the body of the stator core. The end frames, however, do not present large frictional areas of contact to the end stator core laminations.

The circular flanges which receive the corners of the laminations supplement the small areas of frictional contact, and prevent radial displacement between the stator core 1 and end frames 2.

The bolt holes being adjacent the rivets, the leverage between the rivets and bolts is reduced and the strain on the frames is materially reduced.

The flanges for the stator core may be on the lugs radially inward from the periphery of the frames, as shown in Figs. 1 to 3, or they may be on the lugs and on the periphery of the frame as shown in Figs. 4 and 5.

In all modifications, the inside edge 34 of the end frames, at the end adjacent the end casings 3, may be circular to conform with the end casings 3.

Air is circulated in the machine and blown out through the orifices 35 by fans 6'.

Of course, this invention is susceptible of various other modifications and adaptations.

What I claim is:

1. A stator for dynamo-electric machines, comprising a square laminated core, an end frame arranged on each end of said core and extending outside the same to provide a substantially continuous passage around said core between the same and said end frame, lugs on said end frame for holding said core in place, and a casing mounted on each end frame.

2. A stator for dynamo-electric machines, comprising a square laminated core, an end frame arranged on each end of said core and having flat sides arranged parallel to the flat sides of said core and beyond the same to provide passages between said core and said end frame, and a casing arranged on each end frame.

3. In combination, a laminated stator core, and end frames therefor, said frames being provided with flanges for the edges of the stator core, lugs for the face of the stator core intermediate the flanges, said end frames extending radially beyond the stator core intermediate said flanges.

4. A dynamo-electric machine having a laminated polygonal stator core, supporting frames therefor, flanges on the frames at the points of contact between the corners of the stator core and the frames, a rotor supported by said frames, and a fan connected with said rotor.

5. A dynamo electric machine having a laminated polygonal stator core, supporting frames therefor forming openings beyond the sides of said stator core, flanges on said frames over the corners of said stator core, a shaft supported by said frames, and a rotor on said shaft having fans.

6. A dynamo electric machine having a polygonal laminated stator core, supporting frames therefor forming openings for discharging air from the machine, longitudinal flanges over the corners of said stator core on said frames, and a rotor having fans thereon.

7. A dynamo electric machine comprising a polygonal laminated stator core, frames in contact with the ends of said stator core, longitudinal flanges in contact with the corners of said stator core, end casings supported by said frames, bearings at the centers of said casings, a shaft supported by said bearings, a rotor carried by said shaft, and fans connected to said shaft.

8. In a dynamo electric machine, a polygonal laminated stator core, supporting frames in contact with the ends thereof having internal peripheries extending radially beyond the sides of said stator core, and longitudinal flanges on said frames enclosing the corners of said stator core at the ends thereof, said stator core having one or more sides unenclosed and free to the atmosphere.

9. A dynamo electric machine having two supporting frames therefor, a polygonal laminated stator core substantially unenclosed at the sides, longitudinal flanges on said frames supporting the corners of said stator core, said frames being in contact with the ends of said stator core and having an internal periphery extending beyond the sides of said stator core, end casings supported by said frames, a rotor supported by said casings, and fans carried by said rotor.

10. A dynamo electric machine having a polygonal laminated stator core, the outside surfaces of which are substantially unenclosed and open to the atmosphere, end supporting frames therefor having flanges for the corners of said stator core and an internal periphery extending radially beyond the sides of said stator core at the ends thereof, and a rotor supported by said frames within said stator core.

11. In a dynamo electric machine, a polygonal laminated stator core, supporting frames in contact with the ends thereof having internal peripheries extending radially beyond the sides of said stator core, and radial displacement preventing means between the corners of said stator core and said frames, said stator core having one or more sides unenclosed and free to the atmosphere.

12. A dynamo electric machine having two supporting frames therefor, a polygonal laminated stator core substantially unenclosed at the sides, radial displacement preventing means between the corners of said stator core and said frames, said frames being in contact with the ends of said stator core and having an internal periphery extending beyond the sides of said stator core, end casings supported by said frames, a rotor supported by said end casings, and fans carried by said rotor.

13. A dynamo electric machine stator comprising a square stator core, an end frame therefor, and an end casing mounted on said frame to release air longitudinally and radially into the atmosphere from said end casing.

14. A dynamo electric machine comprising a square stator core and a support therefor, said support having lugs for the faces of the core at the corners thereof, bars for the faces of the core at the sides thereof, flanges for the corners of the core, and means for securing said support and core from longitudinal displacement.

15. A stator for a dynamo electric machine comprising separate end frames each having concentric inward and outward lateral flanges and inward radial lugs, a square laminated core having a central circular pole face and outer corners concentric thereto and arranged between said end frames and held concentric thereto and in alignment therewith by said inward central flanges engaging said corners, bolts passing through said core near said corners and said inward radial lugs to hold said end frames and core together, an end plate carried by each end frame and having a central bearing and an inward lateral flange concentric to said bearing and engaging said outer lateral flange to center said bearing relative to said pole face, and said end frames extending away from said core to provide a substantially continuous passage around said core between the same and said end frames.

In witness whereof, I have hereunto subscribed my name.

JOHN M. BARR.